Oct. 11, 1966 A. H. BOBECK 3,278,910

MAGNETIC MEMORY CIRCUITS

Filed Feb. 5, 1963 3 Sheets-Sheet 1

INVENTOR
A. H. BOBECK
BY John F. Powell
ATTORNEY

Oct. 11, 1966 A. H. BOBECK 3,278,910

MAGNETIC MEMORY CIRCUITS

Filed Feb. 5, 1963 3 Sheets-Sheet 2

United States Patent Office 3,278,910
Patented Oct. 11, 1966

3,278,910
MAGNETIC MEMORY CIRCUITS
Andrew H. Bobeck, Chatham, N.J., assignor to Bell Telephone Laboratories, Incorporated, New York, N.Y., a corporation of New York
Filed Feb. 5, 1963, Ser. No. 256,468
17 Claims. (Cl. 340—174)

This invention relates to information storage arrangements and more particularly to such arrangements in which information is stored in the form of remanent magnetization states within magnetic memory elements.

Magnetic information storage arrangements employing magnetic memory elements as information storage addresses are well known in the information handling and processing art. The substantially rectangular hysteresis characteristics of the magnetic materials of which such elements are made enable them to store binary values by being magnetized in either of two remanent flux states. The well known toroidal magnetic core, for example, has one binary value associated with one of the remanent states and the other binary value with the other of the remanent states. Which of the binary values is stored in the core at any given time is determnied by applying a readout current pulse to a winding inductively coupled to the core. Should a reversal of the magnetic flux from one of its remanent states to the other remanent state occur as a result of the applied readout current pulse, a voltage will be induced across a sensing winding also inductively coupled to the core which voltage will be indicative of a particular binary value.

Other information storage arrangements employing magnetic memory elements are disclosed in the copending application of A. H. Bobeck and J. L. Smith, Serial No. 215,318, filed August 7, 1962, which application may be considered incorporated herein by reference. One arrangement disclosed in the aforesaid application utilizes a high magnetic permeability base plate having two sets of orthogonal slots therein forming a plurality of posts arranged in rows and columns in the base plate. A sheet of magnetic material having a substantially rectangular hysteresis characteristic is positioned across the tops of the posts. Information is stored on a word-organized basis with a word conductor passing in zig-zag fashion between the posts of each row of posts. Each word conductor is positioned between the posts of its associated row such that it passes in the same direction between the first and second posts and between the second and third posts of each of a plurality of groups of three adjacent posts. Each of such groups of three posts together with the overlay magnetic sheet comprise a bit address of the array. The first and second posts, together with the overlay sheet comprise a first memory cell of the address while the second and third posts, together with the overlay sheet, comprise a second such cell of the address. Bit conductors pass between the columns of posts such that each bit address has a single bit conductor passing in one sense between its first and second posts and in the opposite sense between its second and third posts.

Information is stored in the bit addresses comprising a single word by applying simultaneous input signals to a selected word conductor and to each of the bit conductors, the particular binary value stored in each bit address being determined by the polarity of the signal applied to its associated bit conductor. The input signals applied to the word and bit conductors are of a magnitude such that their sum produces a magnetizing force which exceeds the coercive force of the overlay magnetic material while their difference produces a magnetizing force less than the coercive force. One cell of each bit address of the selected word location is thereby switched from a remanent magnetic condition initially uniform in all of the cells to an opposite remanent condition. Interrogation is achieved by applying an opposite polarity signal to the word conductor of a magnitude sufficient to re-establish uniform remanent conditions in all cells of the word location being interrogated. Signals induced on the bit conductors during interrogation are detected, their polarities manifesting the information stored in respective addresses of the interrogated word.

The magnetic flux path within any of the memory cells of the array passes through the base plate, a pair of posts, and the portion of the overlay sheet between the posts. Since the base plate and posts are constructed of a high permeability material, the total reluctance of the path depends almost entirely upon the reluctance of the portion of its length which passes through the square loop overlay material. Consequently, the required magnitudes of write and read current pulses applied to word and bit conductors threading the posts are also dependent upon the length of square loop material in the flux path. The magnitudes of the current pulses are also dependent upon the amount of flux switched during the operation of the array which in turn is dependent upon the saturation flux density of the square loop material. It is advantageous, for reasons of economy, inter alia, to minimize the magnitudes of current pulses necessary for satisfactory operation of such arrays.

Accordingly, it is an object of this invention to provide a magnetic memory circuit of the type hereinbefore described in which read and write current pulses of smaller magnitude may be utilized.

A further object of this invention is to provide a magnetic memory circuit which is more easily fabricated than prior art arrays utilizing toroidal magnetic cores. Yet another object of this invention is to provide a new and improved magnetic memory circuit.

The above and other objects of this invention are realized in one embodiment of a memory array according to the principles of this invention which comprises a high magnetic permeability base plate having a plurality of posts formed thereon in rows and columns by two sets of orthogonal slots cut into the base plate. The base plate is affixed to a sheet of nonmagnetic material, such as glass, for example, and one set of slots are cut through the entire base plate thereby magnetically isolating the rows of posts from each other. Each successive third slot of the other set of slots is also cut through the entire base plate. As a result, a plurality of segments of the base plate, each including three linearly aligned posts are created which are magnetically isolated from each other.

Word conductors pass in zig-zag fashion between the posts of respective ones of the rows of posts with each conductor passing in the same direction between the first and second posts and between the second and third posts of each of the three-post segments of its associated row. Bit conductors pass between the columns of posts such that each three-post segment has a single bit conductor passing in one sense between its first and second posts and in the opposite sense between its second and third posts.

A first sheet of magnetic material having a low saturation flux density and substantially rectangular hysteresis characteristics is bonded to a second sheet of high magnetic permeability material and the two sheets are positioned across the tops of the posts with the first sheet facing the posts.

A magnetic cell is defined in the array by two adjacent posts of one of the three-post segments, the portion of the base plate between them, and the first and second magnetic sheets positioned above them. A flux path within the cells passes through one of the posts, a portion of the first sheet adjacent the post, the second sheet, a portion of the first sheet adjacent the other post, the other post, and the portion of the base plate between the two posts. The total magnetic reluctance of the path depends almost entirely upon the two portions of the first sheet included in the path. In order to establish remanent magnetization in the path a magnetomotive force must be applied thereto of a magnitude at least equal to $2H_cl$ where $H_c$ is the coercive force of the first sheet and $l$ is the thickness of each of the two portions of the first sheet included in the path. In this invention, $l$ may be chosen without regard to the distance between the two posts of each cell. The posts may therefore be separated by a distance sufficient to provide for ease of wiring the array without an accompanying increase in $l$. A small but unavoidable air gap exists between the first sheet and both the second sheet and the posts, however, which effectively places a lower limit on the value of $l$. This lower limit, however, is a function of the flux in the air gap and can be reduced by a reduction in the flux. This invention therefore is also directed toward a further reduction of the applied magnetomotive force achieved by reducing the total magnetic flux in the flux paths. This is accomplished by using a material having a low saturation flux density ($B_S$), such as a garnet material, for example, for the first sheet. Such a material has a saturation flux density of 200 gauss or less whereas that of conventional ferrite materials is 2,000 gauss or more and that of permalloy is 7,000 gauss or more. Such a reduction in the total flux by an order of magnitude or more results in a substantial reduction in the required magnitude of the applied magnetomotive force. The thickness of the first sheet will ordinarily be in the order of several mils.

The amount of flux switched during the operation of the array is determined by the surface area of the posts. This results since saturation of the low saturation flux density material limits the amount of flux switched and since this flux follows a path in this material which is perpendicular to the post surface. The amount of flux entering the low saturation flux density material from the post is therefore limited by the area of the post. Thus, the total amount of flux switched during the operation of the array and, hence, the magnitudes of output signals generated may easily be controlled by changes in the surface areas of the posts.

The present circuit also shares the improvements in fabrication over prior art toroidal core circuits of the circuits described in the copending application referred to hereinbefore.

Since the high permeability second sheet acts as a magnetic short circuit allowing a flux path including any post of the array to close through any other post of the array, interaction between the bit addresses of the array is avoided by magnetically isolating each bit address from every other bit address as described previously.

Another embodiment according to the principles of this invention avoids the necessity of magnetically isolating the three-post segments of the base plate from each other. A plurality of posts are formed on a high permeability base plate by means of two sets of shallow orthogonal slots cut in the plate. A first sheet of low saturation flux density material having substantially rectangular hysteresis characteristics and a second sheet of high magnetic permeability material are bonded to a sheet of nonmagnetic material such as glass. Portions of the two sheets are then etched away so that each of the segments remaining is sufficient to cover only the posts comprising one bit address of the array. Consequently, magnetic isolation of each bit address from the others is achieved by means of isolating segments of the high permeability sheet rather than by isolating segments of the base plate.

In another embodiment according to the principles of this invention, a high permeability base plate has a set of shallow parallel slots therein with a word conductor positioned in each of the slots. Each word conductor passes in one direction through one of the slots and returns in the opposite direction through an adjacent slot. An overlay plate of magnetic material having a low saturation flux density and substantially rectangular hysteresis characteristics also has a set of shallow parallel slots therein and a bit conductor positioned in each of these slots. Each bit conductor also passes in one direction through one of the slots and returns through an adjacent slot. The two plates are positioned together with the two sets of slots positioned orthogonally relative to each other. Contiguous regions of the two plates are rectangular in shape and defined by two adjacent ones of each of the sets of slots. A closed magnetic flux path is formed between two such contiguous regions and the portions of both plates joining them.

The resulting structure operates in a manner similar to that shown in FIG. 6 of the copending application previously referred to. Like that structure, each bit address utilizes nine of said contiguous regions, the regions being positioned in three rows and three columns. Two of the four slots defining the central one of each group of nine regions have a single word conductor positioned therein and the other two of the slots have a single bit conductor positioned therein.

The magnetic reluctance of the flux path within each of the memory cells depends almost entirely upon that part of the path within the low saturation flux density plate. The reluctance of the portion within this plate is reduced by making the plate relatively thick thereby increasing the cross sectional area of the flux path within the plate. Magnetic isolation between the bit addresses is effected by affixing the high permeability plate to a nonmagnetic material such as glass and cutting another set of slots through the entire plate thereby providing a nonmagnetic gap in any flux path linking two separate bit addresses.

The amount of flux switched during the operation of this array will also be determined by the surface area of the rectangular contiguous regions between the plates. This results since the magnetic flux entering the overlay sheet from these regions enters in a direction normal to their surface area. Saturation of the overlay material takes place in the portions of the material bounded by these regions. As a result the total amount of flux switched is, in this embodiment too, dependent upon the area of such contiguous regions. The thickness of the low saturation flux density overlay sheet may be as much as one-eighth inch, or more, which so far as the device is concerned, is equivalent to a sheet of infinite thickness.

Thus according to one feature of this invention, a magnetic memory array utilizing a high magnetic permeability base plate having a plurality of posts extending therefrom has a sheet of low saturation flux density material having substantially rectangular hysteresis characteristics positioned contiguous to each of said posts and a sheet of high magnetic permeability material positioned adjacent said low saturation flux density material to complete flux paths within said base plate, two of said posts and portions of said low saturation flux density material adjacent said posts.

According to another feature of this invention a high magnetic memory array utilizing a high magnetic permeability base plate having a plurality of posts extending therefrom has a sheet of nonmagnetic material bonded to said base plate, the portions of said base plate corresponding to respective bit addresses of the array being spatially separated from each other on the nonmagnetic sheet thereby magnetically isolating the bit addresses from each other.

According to still another feature of this invention a magnetic memory array utilizing a high magnetic permeability base plate having a plurality of posts extending therefrom has a sheet of low saturation flux density material having substantially rectangular hysteresis characteristics positioned over each group of posts forming part of a single bit address, said sheets of low saturation flux density material affixed respectively to sheets of high permeability material which in turn are affixed to a single sheet of nonmagnetic material.

According to another feature of this invention a magnetic memory array is provided which has a first plate of high magnetic permeability material and a second plate of low saturation flux density material having substantially rectangular hysteresis characteristics positioned contiguous to said first plate, a first set of parallel shallow slots in the first plate and a second set of parallel shallow slots, orthogonal to the first set, in the second plate defining a plurality of bit addresses in the array, a sheet of nonmagnetic material affixed to said first plate, and additional slots in said first plate serving to separate spatially on said nonmagnetic sheet the portions of the first plate forming parts of respective bit addresses.

According to yet another feature of this invention a magnetic memory array is provided which utilizes a high magnetic permeability base plate having a plurality of posts extending therefrom, has a sheet of low saturation flux density overlay material having substantially rectangular hysteresis characteristics positioned contiguous to said posts, and is adapted to have flux paths, partially encompassed by said posts and overlay material, such that during the operation of the array magnetic flux entering the overlay material from the posts effects magnetic saturation in the portions of the overlay material in contact with the posts.

A more complete understanding of this invention and of the above and other objects and features thereof may be gained from a consideration of the following detailed description together with the accompanying drawing in which.

Figure 3:
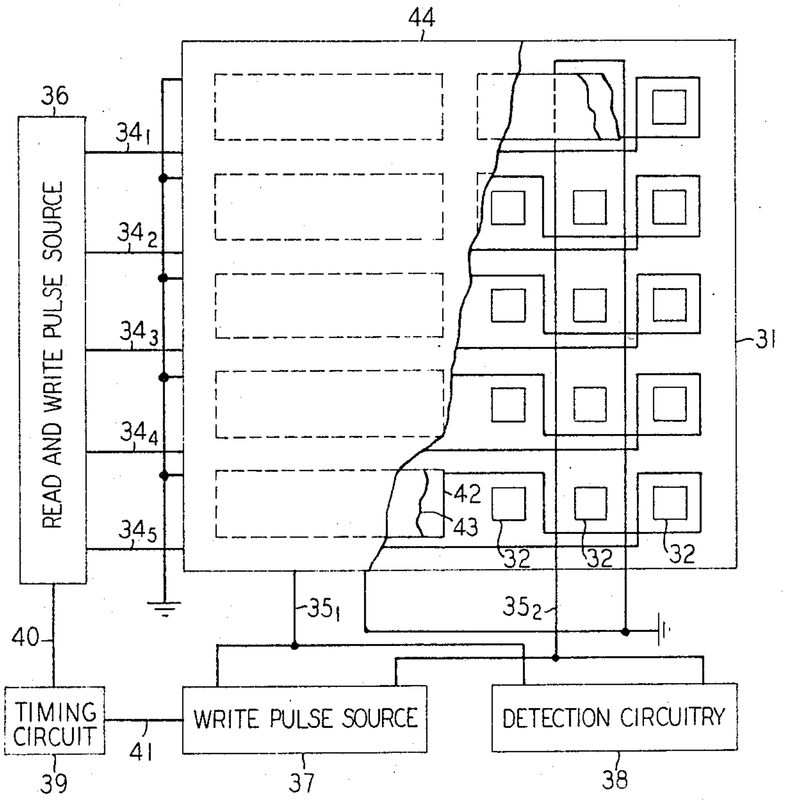
Figure 4:
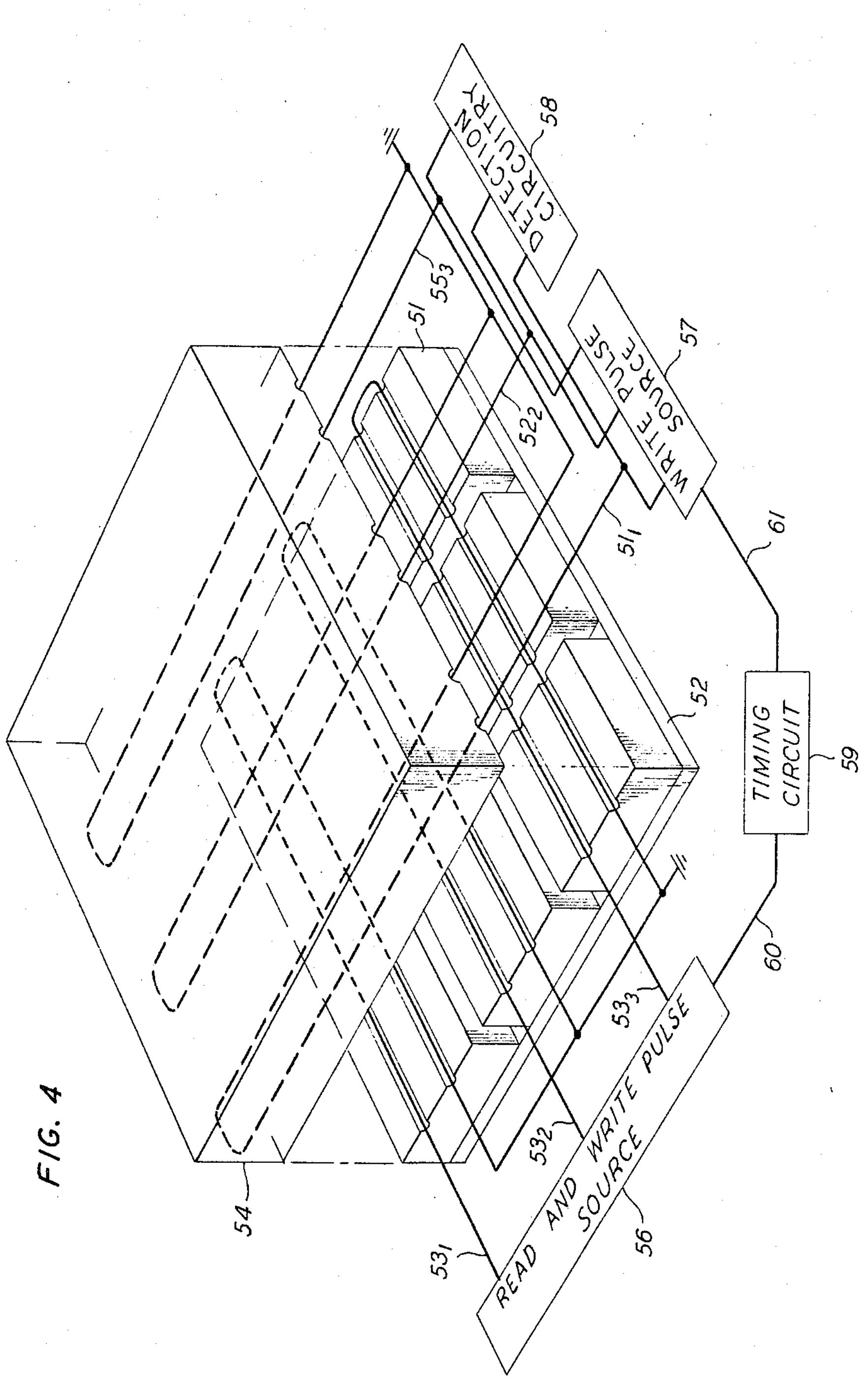

FIG. 3 depicts another specific embodiment in which magnetic isolation between bit addresses is achieved by means of groups of first and second overlay sheets associated with respective single bit addresses, all of said groups of overlay sheets being affixed to a single nonmagnetic sheet; and FIG. 4 depicts another specific embodiment in which a first high permeability plate and a second low saturation flux density and rectangular hysteresis loop plate are contiguously positioned, each having a set of parallel slots with conductors positioned therein and the first plate having additional slots serving to isolate magnetically the bit addresses of the array from each other.

Figure 1:
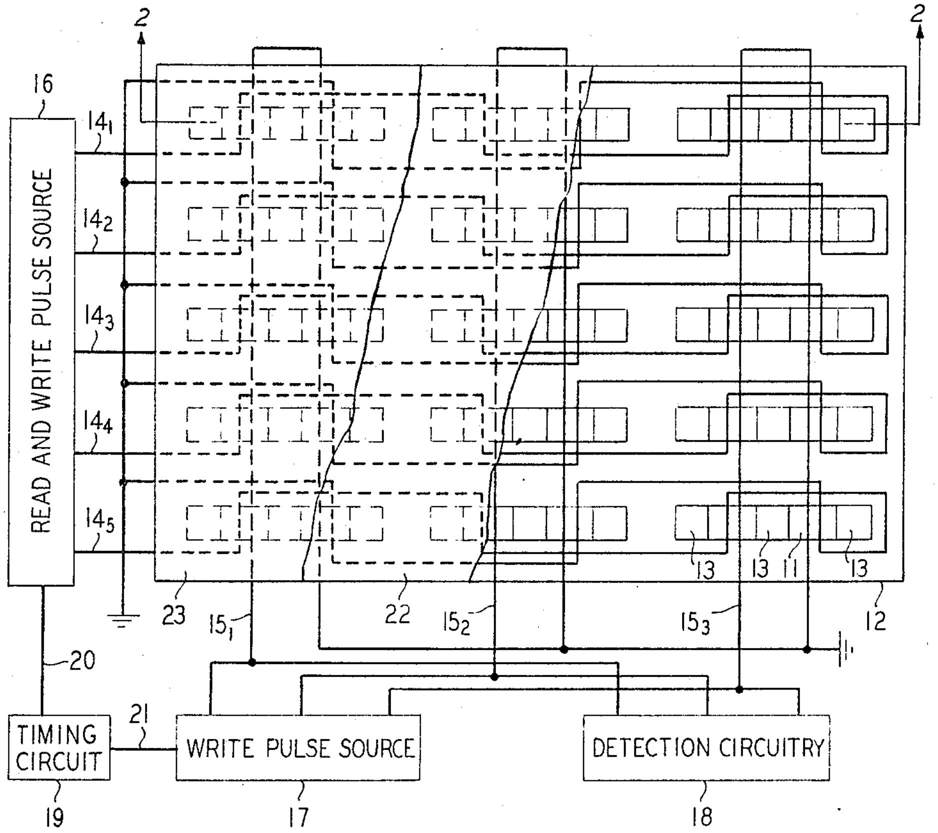
FIG. 1 depicts a specific embodiment of a memory array according to the principles of this invention in which slots spatially separating the portions of the base plate corresponding to respective bit addresses serve to isolate magnetically the bit addresses of the array from each other.

A specific illustrative embodiment of a memory array according to this invention is shown in FIG. 1. A high magnetic permeability plate 11 is bonded to a plate 12 which may be made of glass or other nonmagnetic material. Orthogonal sets of parallel slots cut into the plate 11 form segments of the plate 11 separated from one another on the plate 12 and arranged in rows and columns thereon. Moreover, the slots form three linearly arranged posts 13 extending from each of the segments. The alignment of the segments causes the posts to also be positioned in rows and columns. Word conductors $\mathbf{14_1}$ through $\mathbf{14_5}$ pass in zig-zag fashion, as shown in FIG. 1, between the posts of respective ones of the rows of posts with each conductor passing in one senes between the first and second posts and in the same sense between the second and third posts of each three-post segment. Bit conductors $\mathbf{15_1}$ through $\mathbf{15_3}$ pass between the columns of posts, as shown in FIG. 1, such that each three-post segment has a single bit conductor passing in one sense between its first and second posts and in the opposite sense between its second and third posts. The word conductors 14 are connected between ground potential and a source 16 of read and write pulses. The bit conductors 15 are connected between ground potential and both write pulse source 17 and detection circuitry 18. Timing circuit 19 is connected via conductors 20 and 21 to sources 16 and 17, respectively.

Pulse sources 16 and 17 are shown in block diagram form and may comprise any well known circuits capable of providing current pulses of the character described hereinafter. Detection circuitry 18 is also shown in block diagram form and may comprise any circuitry capable of detecting signals induced in conductors 15. Timing circuit 19 is similarly shown in block diagram form and may comprise well known circuitry capable of timing the energization of sources 16 and 17, in the manner described hereinafter, during the write phase of operation.

Two magnetic overlay sheets 22 and 23 are positioned over the posts 13, sheet 22 being sandwiched between the posts and sheet 23. Both sheets 22 and 23, for illustrative purposes, are shown broken away in FIG. 1. Sheet 22 has a low saturation flux density and substantially rectangular hysteresis characteristics and may, for example, be made of a garnet material. Sheet 23 is bonded to sheet 22 and made of a high magnetic permeability material.

Figure 2:
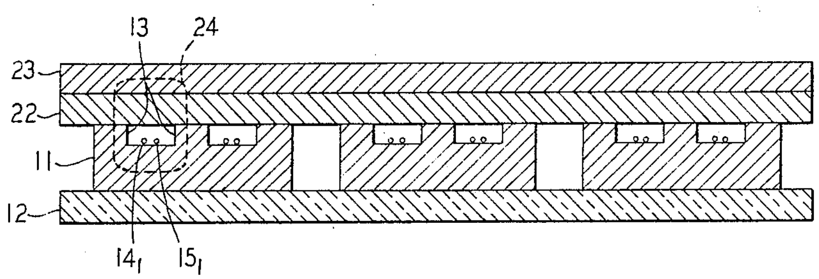
FIG. 2 depicts a sectional view of the array along plane 2—2 shown in FIG. 1.

FIG. 2 depicts a cross section of the array of FIG. 1 taken along plane 2—2 of FIG. 1. A flux path 24 within the left hand memory cell, as viewed in FIG. 2, of the bit address associated with word conductor $\mathbf{14_1}$ and bit conductor $\mathbf{15_1}$ is also shown in FIG. 2. As discussed previously, the magnetic reluctance of the path 24 depends almost entirely upon the two portions of the sheet 22 included in the path and the lengths of these portions may be made the minimum value constant with a substantially rectangular hysteresis loop for the flux path 24 as a whole. The thickness of the sheet 22 will accordingly ordinarily be on the order of a few mils. Moreover, since the portion of the flux path within the sheet 22 is in the same direction as the portion within the posts 13 and closes within sheet 23 rather than in sheet 22, the length of the path within sheet 22 is completely independent of the distance between the posts 13. Therefore, the posts 13 may be spaced apart a distance sufficient to assure a maximum ease of wiring the array without simultaneously increasing the length of square loop material encompasing the flux path.

The operation of the memory array depicted in FIGS. 1 and 2 is similar to that described in connection with FIG. 5 of the aforementioned copending application of A. H. Bobeck and J. L. Smith. Thus, if binary word 101 is to be written into the bit address associated with word conductor $\mathbf{14_1}$, for example, coincident write signals are applied to conductor $\mathbf{14_1}$ and bit conductors $\mathbf{15_1}$ through $\mathbf{15_3}$. The write signals follow a previous negative polarity readout pulse from source 16. The write signals applied to conductors $\mathbf{14_1}$, $\mathbf{15_1}$, and $\mathbf{15_3}$ are of positive polarity while that applied to $\mathbf{15_2}$ is of negative polarity. A subsequent negative polarity readout pulse applied to conductor $\mathbf{14_1}$ from source 15 induces signals indicative of the value 101 in conductors $\mathbf{15_1}$ through $\mathbf{15_3}$ which signals are detected by circuitry 18. Binary information values may be similarly stored and read out of the bit addresses associated with conductors $\mathbf{14_2}$ through $\mathbf{14_5}$.

The readout pulse signals are of a magnitude sufficient to establish uniform reset magnetic conditions in each memory cell associated with a conductor 14 having such a signal applied thereto. The write signals are of a magnitude such that only one cell of each address is switched to a set remanent magnetic condition as a result of the coincident application of write signals to the conductors 14 and 15, the polarity of the write signal on conductor 15 determining which cell of the address is switched.

FIG. 3 depicts another embodiment according to the principles of this invention. A high magnetic permeability plate 31 is shown having a plurality of posts 32 extending therefrom. Word conductors $34_1$ through $34_5$ and bit conductors $35_1$ and $35_2$ pass between the posts 13 in a manner identical to that of conductors 14 and 15 of FIG. 1, as previously described. Conductors 34 are connected between ground potential and a source 36 of read and write pulses and conductors 35 are connected between ground potential and both write pulse source 37 and detection circuitry 38. Timing circuit 39 is connected via conductors 40 and 41 to sources 36 and 37, respectively.

Pulse sources 36 and 37 are shown in block diagram form and may comprise any well known circuits capable of providing current pulses of the character described hereinafter. Detection circuitry 38 is also shown in block diagram form and may comprise any circuitry capable of detecting signals induced in conductors 35. Timing circuit 39 is similarly shown in block diagram form and may comprise well known circuitry capable of timing the energization of sources 16 and 17, in the manner described hereinafter, during the write phase of operation.

Two magnetic overlay sheets 42 and 43 are positioned over each of a plurality of groups of three linearly aligned posts of the posts 32, sheet 42 being sandwiched between the posts and sheet 43. Sheet 42 has a low saturation flux density and substantially rectangular hysteresis characteristics and may, for example, be made of a garnet material. Sheet 43 is bonded to sheet 42 and to a plate 44 which may be made of glass or other nonmagnetic material. The sheets 42 and 43 are positioned on the plate 44 in magnetically isolated segments with each segment positioned over a group of three posts which are associated with a single bit address of the array. Such isolation of the segments may advantageously be obtained by selective etching of single sheets 42 and 43 originally covering the entire plate 44. For illustrative purposes, the plate 44 is shown broken away in FIG. 3 and several of the segments of sheets 42 and 43 are shown extending beyond the broken away edge of plate 44. Also, for illustrative purposes, the segments of the sheets 42 and 43 on the under side of plate 44 are depicted by dotted lines in FIG. 3 while the posts 32 and portions of the conductors 34 and 35 under the plate 44 are not shown.

The operation of the memory array depicted in FIG. 3 is identical to that of the array depicted in FIGS. 1 and 2. Thus if binary word 10 is to be written into the bit addresses associated with word conductor $34_1$, for example, coincident write signals are applied to conductor $34_1$ and conductors $35_1$ and $35_2$, the signals applied to conductors $34_1$ and $35_1$ being of positive polarity and that applied to conductor $35_2$ being of negative polarity. A subsequent negative polarity readout pulse applied from source 36 to conductor $34_1$ induces signals indicative of the value 10 in conductor $35_1$ and $35_2$ which signals are detected by circuit 38. The write and readout pulse signals are of the same magnitude as the corresponding signals utilized in the array depicted in FIGS. 1 and 2.

Magnetic isolation between the bit address of the arrays of FIGS. 1, 2, and 3 is essential to prevent interaction between bit addresses since the high magnetic permeability sheets 23 and 43 act as magnetic short circuits between the bit addresses. This isolation is achieved in FIGS. 1 and 2 by spatial separation of three-post segments on a nonmagnetic plate 12. It is alternatively achieved in FIG. 3 by the spatial separation on a nonmagnetic plate 44 of segments of the two overlay sheets 42 and 43 associated with respective bit addresses of the array.

FIG. 4 depicts still another embodiment according to the principles of this invention. A high permeability base plate 51 is bonded to a plate 52 which may be made of glass or other nonmagnetic material. Word conductors $53_1$ through $53_3$ are positioned in a set of shallow parallel slots in plate 51, as shown in FIG. 4, and are connected between ground potential and a source 56 of read and write pulses. An overlay plate 54 of low saturation flux density material having substantially rectangular hysteresis characteristics is positioned over the base plate. Bit conductors $55_1$ through $55_3$ are positioned in a set of parallel slots in plate 54, as shown in FIG. 4, and are connected between ground potential and both write pulse source 57 and detection circuitry 58. The two sets of slots in which the conductors 53 and 55 are placed are positioned orthogonally to each other and the slots of each set are so positioned that the contiguous regions of the two plates 51 and 54, defined by the slots, are square and of equal area. Closed magnetic flux paths, each traversing the base plate 51, two of said contiguous regions, and the overlay plate 54 are thereby established. The width of each of the contiguous regions may, for example, be of 10 mils while the thickness of the overlay plate 54 may be one-eighth inch which, for practical purposes, is equivalent to an infinite thickness so far as the operation of this embodiment is concerned. Additional slots in the base plate 51 serve to isolate magnetically blocks of nine of such contigiuis regions on the nonmagnetic plate 52, each of said blocks having a single word conductor 53 and a single bit conductor 54 associated therewith.

Pulse sources 56 and 57 are shown in block diagram form and may comprise any well known circuits capable of providing current pulses of the character described hereinafter. Detection circuitry 58 is also shown in block diagram form and may comprise any circuitry capable of detecting signals induced in conductors 55. Timing circuit 59, connected to sources 56 and 57 by conductors 61 and 62, respectively, is also shown in block diagram form and may comprise any well known circuitry capable of timing the energization of sources 56 and 57 in the manner described hereinafter, during the write phase of operation.

The operation of the memory array depicted in FIG. 4 is similar to that described in connection with FIG. 6 of the copending application of A. H. Bobeck and J. L. Smith referred to hereinbefore. Thus, each magnetically isolated group of nine contiguous regions is associated with a respective bit address. Binary information values stored in the array are manifested by magnetic flux in particular flux paths between the various contiguous regions of each address, as described in the aforesaid copending application.

If the binary word 010 is to be written into the bit addresses associated with word conductor $53_1$, for example, coincident write signals are applied to conductor $53_1$ and bit conductors $55_1$ through $55_3$. The write signals follow a previous negative polarity readout pulse from source 56. The write signals applied to conductors $53_1$ and $55_2$ are of positive polarity while those applied to conductors $55_1$ and $55_3$ are of negative polarity. A subsequent negative polarity readout pulse applied to conductor $53_1$ from source 56 induces signals indicative of the value 010 in conductors $55_1$ through $55_3$ which signals are detected by circuitry 58. The write signals are of a magnitude sufficient to establish remanent magnetic conditions in flux paths joining diagonally adjacent ones of said contiguous regions while the readout signal is of a magnitude sufficient to re-establishment remanent magnetic conditions in flux paths joining linearly adjacent ones of said contiguous regions.

Since both the word conductors 53 and bit conductors 55 each pass through two slots in plates 51 and 54, respectively, each bit address utilizes nine of the contiguous regions. By using nonreturning word and bit conductors, bit addresses defined at the intersection of each word conductor and bit conductor would then each utilize four rectangularly arranged ones of said regions.

As discussed hereinbefore, the flux switched during the operation of the arrays shown in FIGS. 1 through 4, and hence the magnitude of output signals derived therefrom, is dependent upon the area of each separate region of high permeability material contiguous to an adjacent overlay sheet of low saturation flux density material. This results since the magnetic flux entering the overlay sheet from these regions enters in a direction normal to their respective surface areas. This is true of the array of FIG. 4 even though, in this embodiment, the flux path closes within the overlay sheet. Since the amount of flux switched during the operation of the embodiment of FIG. 4 is limited by the area of the regions of plate 51, contiguous to overlay plate 54, the overlay plate may be of any convenient thickness. Thus, it may be made relatively thick, as shown in FIG. 4, thereby minimizing the reluctance presented by the plate. The use of an overlay of any convenient size also represents a further advantage over previous mebodiments since in these embodiments the thickness of the overlay sheet controls the amount of flux switched during operation of the array and affects demagnetizing factors which in turn have an effect upon the composite hysteresis characteristics of the bit addresses.

It is to be understood that the specific embodiments of this invention described herein are merely illustrative and that numerous other arrangements according to the principles of the invention may be devised by one skilled in the art without departing from the spirit and scope of this invention.

What is claimed is:

1. A magnetic memory circuit comprising a high permeability base plate having a bottom portion and a first and a second post extending from said bottom portion, a first sheet of magnetic material positioned contiguous to each of said first and second posts, said sheet having substantially rectangular hysteresis characteristics, a second sheet of high magnetic permeability material completing a magnetic flux path within said bottom portion, said first and second posts, and said first sheet contiguous to each of said first and second posts, means for establishing a first and a second remanent magnetic condition in said flux path, and means for detecting a reversal of said remanent condition from said first to said second condition.

2. A magnetic memory circuit according to claim 1 in which said first sheet has a low saturation flux density.

3. A magnetic memory circuit according to claim 2 in which said first sheet is made of a garnet material.

4. A magnetic memory circuit according to claim 2 in which said first sheet has a saturation flux density of less than 2,000 gauss.

5. A magnetic memory circuit comprising a high magnetic permeability base plate having a bottom portion and a plurality of posts extending from said bottom portion, a first sheet of magnetic material positioned contiguous to said posts and having substantially rectangular hysteresis characteristics and a low saturation flux density, a second sheet of high magnetic permeability material positioned contiguous to said first sheet, a first and a second memory cell, each being defined by said bottom portion, said first and second sheets, and two of said posts, each of said cells including a closed flux path therein which traverses said bottom portion, first and second sheets, and two posts of its associated cell, said first and second memory cells together comprising a bit address, means for establishing a first remanent magnetic condition in said first memory cell and a second remanent magnetic condition in said second memory cell indicative of a first binary value stored in said bit address and for establishing said second remanent magnetic condition in said first cell and said first remanent magnetic condition in said second cell indicative of a second binary value stored in said bit address, and means for detecting the binary information value stored in said bit address.

6. A magnetic memory circuit according to claim 5 in which the posts of said first and second cells are linearly positioned on said base plate, said first cell comprising a first and a second one of said posts and said second cell comprising a third and said second one of said posts.

7. A magnetic memory circuit comprising a base portion having a plurality of high magnetic permeability posts extending therefrom and high magnetic permeability means connecting selected ones of said posts, a plurality of bit addresses each including two memory cells, each of said cells comprising two of said posts, a portion of said high permeability means extending between said posts, a first sheet of magnetic material positioned contiguous to said posts and having substantially rectangular hysteresis characteristics and a low saturation flux density, and a second sheet of high magnetic permeability material positioned contiguous to said first sheet; each of said cells including a closed flux path therein which traverses said two posts, said high permeability material joining them, and said first and second sheets of its associated cell, means for magnetically isolating said bit addresses from each other, means for establishing a first remanent magnetic condition in the firt memory cell and a second remanent magnetic condition in the second memory cell of a selected one of said bit addresses indicative of a first binary value stored in said selected address and for establishing said second remanent magnetic condition in said first cell and said first remanent magnetic condition in said second cell indicative of a second binary value stored in said selected bit address, and means for detecting the binary information value stored in said selected bit address.

8. A magnetic memory circuit according to claim 7 in which said means for magnetically isolating said bit addresses comprises a nonmagnetic plate, said base portion being bonded to said nonmagnetic plate and segments of said base portion corresponding to respective bit addresses being spatially separated on said nonmagnetic plate.

9. A magnetic memory circuit according to claim 7 in which said means for magnetically isolating said bit addresses comprises a nonmagnetic plate, the first and second sheets corresponding to respective ones of said bit addresses being bonded to said plate and spatially separated on said nonmagnetic plate.

10. A magnetic memory circuit comprising a nonmagnetic plate having a plurality of spatially separated segments of high magnetic permeability material affixed thereto, each of said segments including a base portion and a plurality of posts extending therefrom, a first sheet of magnetic material positioned contiguous to all of said posts and having substantially rectangular hysteresis characteristics and a low saturation flux density, a second sheet of high magnetic permeability material positioned contiguous to said first sheet, a bit address defined by each of said high permeability segments and said first and second sheets, each bit address including a first and a second memory cell each including a closed flux path therein which traverses the base portion and two of the posts of its associated address and said first and second sheets, means for establishing a first remanent magnetic condition in the first memory cell and a second remanent magnetic condition in the second memory cell of a selected one of said bit addresses indicative of a first binary value stored in said selected address and for establishing said second remanent magnetic condition in said first cell and said first remanent magnetic condition in said second cell indicative of a second binary value stored in said selected bit address, and means for detecting the binary information value stored in said selected bit address.

11. A magnetic memory circuit comprising a high magnetic permeability base plate having a bottom portion and a plurality of posts extending from said bottom portion, a plurality of bit addresses each including two memory cells, each of said cells comprising said bottom portion, two adjacent ones of said posts, a first sheet of magnetic material positioned contiguous to said posts and having substantially rectangular hysteresis characteristics and a low saturation flux density, and a second sheet of high magnetic permeability material positioned contiguous to said first sheet; each of said cells including a closed flux path therein which traverses said bottom portion, said two posts, and said first and second sheets; and a nonmagnetic plate, said first and second sheets being bonded to said plate, the sheets corresponding to respective ones of said bit addresses being spatially separated on said nonmagnetic plate.

12. A magnetic memory circuit comprising a nonmagnetic plate having a plurality of spatially separated segments of high magnetic permeability material affixed thereto, each of said segments including a base portion and three linearly aligned posts extending therefrom, a first sheet of magnetic material positioned contiguous to all of said posts and having substantially rectangular hysteresis characteristics and a low saturation flux density, and a second sheet of high magnetic permeability material positioned contiguous to said first sheet, a bit address defined by each of said high permeability segments and said first and second sheets, each bit address including a first and a second memory cell, said first cell including a closed flux path which traverses the base portion and the first and second of the posts of its address and said first and second sheets, and said second cell including a closed flux path which traverses the base portion and the third and second posts of its address and said first and second sheets.

13. A magnetic memory circuit comprising a high magnetic permeability base plate having a bottom portion and a plurality of posts extending from said bottom portion, said posts being positioned in rows and columns on said plate, a plurality of bit addresses each including two memory cells, a first of said cells of each of said addresses comprising said bottom portion, a first and a second adjacent ones of said posts, a first sheet of magnetic material positioned contiguous to said posts and having substantially rectangular hysteresis characteristics and a low saturation flux density, and a second sheet of high magnetic permeability material positioned contiguous to said first sheet; the other of said cells comprising said bottom portion, said second and a third adjacent ones of said posts, said first sheet, and said second sheet; each of said cells including a closed flux path therein which traverses said bottom portion, said two posts, and said first and second sheets; a nonmagnetic plate, said first and second sheets being bonded to said plate, the sheets corresponding to respective ones of said bit addresses being spatially separated on said nonmagnetic plate, means for establishing a first remanent magnetic condition in the first memory cell and a second remanent magnetic condition in the second memory cell of a selected one of said bit addresses indicative of a first binary value stored in said scelected address and for establishing said second remanent magnetic condition in said first cell and said first remanent magnetic condition in said second cell indicative of a second binary value stored in said selected bit address, and means for detecting the binary information value stored in said selected bit address.

14. A magnetic memory circuit comprising a high permeability base portion, a sheet of magnetic material positioned over said base portion and having substantially rectangular hysteresis characteristics and a low saturation flux density, means for causing certain predetermined regions of said base portion to be in contact with said magnetic sheet, closed magnetic flux paths being established within said base portion and said sheet and between adjacent ones of said regions, means for establishing remanent magnetic conditions within particular ones of said flux paths representative of binary information values and for effecting magnetic saturation in the portions of said magnetic sheet adjacent those ones of said predetermined regions including said particular flux paths, and means for detecting the particular binary information values stored in said flux paths.

15. A magnetic memory circuit according to claim 14 in which said means for causing certain predetermined regions of said base portion to be in contact with said magnetic sheet include a first set of parallel slots in said base plate and a second set of parallel slots in said magnetic sheet, said sets of slots being orthogonally positioned relative to each other.

16. A magnetic memory circuit according to claim 14 further comprising a plate of nonmagnetic material, said base portion being bonded to said nonmagnetic plate and segments of said base portion each including preselected ones of said predetermined regions being spatially separated on said nonmagnetic material.

17. A magnetic memory circuit according to claim 14 in which said predetermined regions are substantially rectangular and said magnetic sheet is of a thickness substantially greater than the width of said regions.

No references cited.

BERNARD KONICK, *Primary Examiner.*

G. LIEBERSTEIN, *Assistant Examiner.*